Patented Sept. 13, 1938

2,129,813

UNITED STATES PATENT OFFICE 2,129,813

PRODUCTION OF ANHYDROUS SODIUM SULPHATE

Robert Roger Bottoms, Louisville, Ky., assignor to The Girdler Corporation, Louisville, Ky., a corporation of Delaware No Drawing. Application February 25, 1935, Serial No. 8,059

7 Claims. (Cl. 23—121)

The present invention is a simple method of obtaining anhydrous sodium sulphate directly from aqueous solutions of sodium sulphate, and the main objects are to obtain the anhydrous salt in fine crystalline form, and to prevent the caking and adhering of the salt on the walls of the vessel in which the solution is treated.

Although the invention of the present application is broadly directed to the production of anhydrous sodium sulphate from aqueous solutions of various concentrations and compositions, the invention will be illustratively described in connection with the recovery of sodium sulphate from solutions which are produced in the removal and recovery of hydrocyanic acid from coke oven gases.

In the process of removing hydrocyanic gases from coke oven gases, or other gas mixtures containing the same, the gases are passed into contact with, or into absorption relationship with, sodium sulphide solutions.

The hydrocyanic acid will be absorbed by the sodium sulphide with the production of sodium thiocyanate which may then be oxidized to produce hydrocyanic acid and sodium sulphate. After the removal and the recovery of hydrocyanic acid, the sodium sulphate will remain, and it is necessary for the economical performance of the process that such sodium sulphate be recovered so that it may be readily reconverted into sodium sulphide.

However, in recovering this sodium sulphate for reconversion into sodium sulphide, considerable difficulty has been experienced in evaporating off the water to obtain the anhydrous crystalline sodium sulphate, due to the fact that the salt tends to deposit upon and stick to the tubes of the evaporators, which results in caking and encrusting of such tubes with loss in efficiency and rapid breakdown of such mechanical equipment.

It is among the objects of the present invention to provide a process which will permit the crystallization of anhydrous sodium sulphate while concentrating a boiling aqueous solution containing the same, with elimination of any tendency to cause encrusting or caking on the tubes of the evaporators which may be employed for this purpose, and without the need of cooling the solution or of adding excessive amounts of any foreign material.

Other objects will appear during the course of the following specification.

In accomplishing these objects it has been found most satisfactory to add to the sodium sulphate solution, which may be a solution from which the hydrocyanic acid has been recovered in the treatment of coke oven gases or salt cake from the manufacture of hydrochloric acid or a natural brine or extract, a salt of an alkali metal or of magnesium which has a substantially greater solubility in water than sodium sulphate.

Among the preferred salts which may be utilized for this purpose are sodium thiocyanate, sodium, potassium or magnesium bromides or iodides, sodium or potassium thiosulphate, potassium or sodium formate, potassium thiocyanate and other highly soluble salts of metals which do not form a precipitate with sulphuric acid, provided such salts have a greater solubility in water than sodium sulphate. Of these compounds I prefer to use sodium thiosulphate or sodium thiocyanate.

The sodium sulphate solution with such addition may be evaporated and crystallized in ordinary tubular evaporators and crystallizers without difficulty due to caking and encrusting of the anhydrous sodium sulphate. The sodium sulphate will crystallize from the boiling solution in fine, regular crystals which do not agglomerate.

It has been found that only a small proportion of such alkali metal or magnesium salt is required. For example, such salt need only be added in amounts not exceeding 20% and not less than 1% and preferably between about 5% to 10% of the amount of sodium sulphate present.

The crystals resulting from a crystallization of sodium sulphate from solutions containing sodium thiocyanate or other added salts of magnesium or alkali metals may then be separated from the mother liquor and washed free of sodium thiocyanate or other added salts with a small amount of water.

Having thus described my invention, what I claim as new and desire to secure by Letters Patent is:

1. The process of producing anhydrous sodium sulphate from a boiling water solution and in a form which does not crystallize on or cling to the equipment employed, said process including concentrating the solution by boiling to a point beyond which the sodium sulphate begins to be crystallized out of solution and adding to said solution, before or during the boiling, a compound selected from the group consisting of sodium thiocyanate, sodium thiosulphate, sodium formate, potassium thiocyanate, potassium thiosulphate, potassium formate, sodium bromide, sodium iodide, potassium bromide, potassium iodide, magnesium bromide, magnesium iodide, and in an amount between 1% and 20% of the sodium sulphate.

2. The process of producing anhydrous sodium sulphate from a boiling water solution and in a form which does not crystallize on or cling to the equipment employed, said process including concentrating the solution to a point beyond which the sodium sulphate begins to be crystallized out of solution, and adding about 1% to 20% of potassium thiocyanate to the solution before or during the boiling.

3. The process of producing anhydrous sodium sulphate from a boiling water solution and in a form which does not crystallize on or cling to the equipment employed, said process including concentrating the solution to a point beyond which the sodium sulphate begins to be crystallized out of solution, and adding about 5% to 10% of potassium thiocyanate to the solution before or during the boiling.

4. The process of producing anhydrous sodium sulphate from a boiling water solution and in a form which does not crystallize on or cling to the equipment employed, said process including concentrating the solution by boiling to a point beyond which the sodium sulphate begins to be crystallized out of solution, and adding about 1% to 20% of sodium thiocyanate to the solution before or during the boiling.

5. The process of producing anhydrous sodium sulphate from a boiling water solution and in a form which does not crystallize on or cling to the equipment employed, said process including concentrating the solution by boiling to a point beyond which the sodium sulphate begins to be crystallized out of solution, and adding about 5% to 10% of sodium thiocyanate to the solution before or during the boiling.

6. The process of producing anhydrous sodium sulphate from a boiling water solution and in a form which does not crystallize on or cling to the equipment employed, said process including concentrating the solution by boiling to a point beyond which the sodium sulphate begins to be crystallized out of solution, and adding about 1% to 20% of sodium thiosulphate to the solution before or during the boiling.

7. The process of producing anhydrous sodium sulphate from a boiling water solution and in a form which does not crystallize on or cling to the equipment employed, said process including concentrating the solution by boiling to a point beyond which the sodium sulphate begins to be crystallized out of solution, and adding about 5% to 10% of sodium thiosulphate to the solution before or during the boiling.

ROBERT ROGER BOTTOMS.